Patented Sept. 12, 1950

2,522,455

UNITED STATES PATENT OFFICE 2,522,455

MINERAL OIL CONTAINING A COPOLYMER OF AN ALIPHATIC MONOOLEFIN AND DIHYDRONAPHTHALENE

Eugene Lieber, Chicago, Ill., assignor to Standard Oil Development Company

No Drawing. Application June 24, 1948, Serial No. 35,052

4 Claims. (Cl. 252—59)

This invention relates to a novel hydrocarbon copolymerization process and to the products resulting therefrom, and to uses of said products. More particularly, it relates to the preparation of novel, high molecular weight organic copolymers, and to the use of said copolymers as lubricating oil additives, etc.

Broadly, the invention comprises copolymerizing an aliphatic olefin, preferably an isoolefin such as isobutylene, with a dihydronaphthalene or polymerizable methyl, ethyl, chloro or other derivatives thereof to produce polymeric materials, preferably having a linear or chain type structure and having a molecular weight of at least 2,000, preferably about 5,000.

Various aliphatic olefins may be used instead of isobutylene, such as propylene, methyl-2 butene-1 or normal butene, etc. Either the 1:2 dihydronaphthalene or 1:4 dihydronaphthalene may be used.

The reaction is preferably carried out at temperatures below 0° C. such as at —23° C. the boiling point of liquid methyl chloride, or at —78° C. the temperature obtained by the use of solidified carbon dioxide as refrigerant, or even lower temperatures such as —103° C. obtained with the use of liquid ethylene at atmospheric pressure.

Reaction may be carried out in the presence of an inert solvent or diluent if desired, such as some of the saturated petroleum hydrocarbons, e. g., propane, butane, a refined naphtha fraction, various halogenated hydrocarbons such as methyl chloride, ethyl chloride, etc.

The copolymerization is preferably carried out in the presence of a catalyst of the Friedel-Crafts type such as aluminum chloride, boron fluoride, titanium tetrachloride or various Friedel-Crafts complexes known to the art. The amount of catalyst used may vary within a fairly wider range depending partly on the temperature of copolymerization, and upon the activity of the particular catalyst used, but normally it will range from about 0.1 to 2% by weight of the reactant. If desired, the catalyst may be added as a solution in a suitable solvent such as methyl chloride, ethyl chloride, etc., which solution has been preferably made at the boiling point of the solvent or at room temperature, and subsequently cooled down to the desired copolymerization temperature.

The proportion of the two primary reactants to be copolymerized may vary to some extent depending upon the particular olefins used, and depending upon the temperature of copolymerization, but normally will be within the approximate limits of about 0.1% to about 30% by weight of dihydronaphthalene, the preferred proportions being about 1 to 10% by weight of dihydronaphthalene.

After the copolymerization reaction has been completed, the residual catalyst is hydrolyzed by adding a suitable hydrolyzing agent such as a lower aliphatic alcohol either alone or together with some water or aqueous caustic soda, or other suitable agent.

This hydrolysis may either be carried out before or after permitting the reaction mass to come to room temperature. After the hydrolysis, the copolymer, either still dissolved in the solvent or if present during the copolymerization reaction or precipitated out in the form of a plastic mass or hard granules or as a suspension in the hydrolyzing fluid, is separated from the catalyst sludge and hydrolyzing agent by any suitable means such as filtering, coagulating, draining, etc. and finally the copolymer product having a physical form ranging from a viscous liquid to a plastic or resinous solid is freed from any remaining traces of water or volatile solvent by distillation or hot milling. If the copolymer is intended to be used in solution in a mineral lubricating oil or other non-volatile solvent medium, such solvent may be added before evaporation of any volatile solvent, as this will facilitate solution of the polymer in the non-volatile solvent.

The resulting copolymer having a molecular weight of at least 2,000, preferably above 5,000 may have a molecular weight of 20,000, 30,000 or even substantially higher. This copolymer has surprisingly good viscosity index improving properties when added to mineral lubricating oil, as will be apparent from the experimental data given hereinbelow. The copolymer may also be added to other petroleum products such as naphtha or gasoline, kerosene, gas oil, Diesel oil, paraffin wax, petrolatum, or various wax compositions, asphalt, lubricating greases containing various soaps such as sodium, lithium, calcium or aluminum soap, etc. In making any such blends containing waxy oil or paraffin wax, various wax-modifying agents or pour depressors may be used.

The copolymer product of this invention may also be used for various other purposes such as a resinous constituent of adhesives and coating compositions or as a plasticizer or modifier for other resinous products or rubbery materials, such as natural rubber, synthetic rubber of the polybutadiene type or the butadiene-styrene type or of the low-temperature isobutylene-isoprene type or other synthetic, high-molecular weight hydrocarbon materials such as polybutene, styrene-isobutylene copolymers, etc. It may also be sheeted into self-sustaining films.

The novel copolymer of this invention may also be subjected to various chemical reactions to produce chemical derivatives having novel properties particularly advantageous for various purposes; such chemical reactions include halogenation such as chlorination, oxidation, hydrogenation, nitration, sulfonation, etc. as well as sulfurization either with elemental sulfur or sulfur chloride or with phosphorus sulfide such as $P_2S_5$, reaction with chlorinated paraffin wax, acyl halides, e. g., stearyl chloride, etc.

The objects, advantages and details of the invention will be better understood from a consideration of the following experimental data.

A series of tests was made in which various concentrations of 1,4 dihydronaphthalene ranging from 1 to 20% by weight in isobutylene (in liquid phase) were copolymerized at either $-78°$ C. or $-24°$ C. by the use of aluminum chloride catalyst in a concentration of about 0.5 or 0.8 gm. per 100 mls. of mixed reactants. In each case, the resultant copolymer was dissolved in a paraffin type mineral lubricating oil base stock having a viscosity of about 45 S. S. U. at 210° F. and a viscosity index of about 100, the amount of copolymer added to the oil ranging from about 1 to 6% by weight, and then the resulting blends were examined for viscosity at 210° F. and for viscosity index. The molecular weight of the copolymer, as determined by the Staudinger method, is also shown in the following table of data:

| Test No. | Per Cent DHN in Feed | Gm./100 Ml. Cat. Conc. | Viscosity Cs. at 210° F. | Per Cent Blend | V. I. | Mol. Wt. (Staud.) |
|---|---|---|---|---|---|---|
| Tests made without diluent, using $CO_2$ internal refrigerant at $-78°$ C. | | | | | | |
| 1 | 1.5 | 0.5 | 26.63 | 3 | 135.3 | |
| 2 | 1.5 | 0.5 | 16.01 | 3 | 137.9 | 17,200 |
| 3 | 1 | 0.5 | 10.29 | 1 | 135.7 | 31,200 |
| 4 | 2 | 0.5 | 8.82 | 1 | 133.1 | 28,700 |
| 5 | 5.0 | 0.5 | 21.55 | 6 | 135.2 | 15,200 |
| 6 | 3 | 0.5 | 10.61 | 3 | 135.7 | 20,200 |
| 7 | 5 | 0.5 | 12.71 | 3 | 135.3 | 13,800 |
| 8 | 10 | 0.5 | 15.22 | 6 | 135.3 | 10,800 |
| 9 | 20 | 0.5 | 8.97 | 6 | 130.5 | 4,200 |
| 10 | 1 | 0.8 | 12.95 | 6 | 132.2 | 6,700 |
| 11 | 3 | 0.8 | 11.38 | 6 | 130.0 | 6,100 |
| 12 | 5 | 0.8 | 10.03 | 6 | 128.2 | 4,900 |

The copolymer obtained in test 4 was studied for viscosity characteristics when blended in a paraffinic lubricating oil base stock in concentrations of 1, 3 and 6% with the following results:

| Percent Polymer | 1 | 3 | 6 |
|---|---|---|---|
| Vis./100° F. (cs.) | 55.51 | 123.85 | 319.6 |
| Vis./210° F. (cs.) | 8.82 | 18.97 | 44.1 |
| V. I. | 133.1 | 139.3 | 131.8 |

The above data indicate a number of unexpected results, including first, the mere fact that dihydronaphthalene will copolymerize with a lower aliphatic olefin such as isobutylene at temperatures below 0° C. with a Friedel-Crafts catalyst, and secondly, that in a number of instances, it actually produces a copolymer having better viscosity index improving characteristics than polyisobutylene. The reasons for these surprising and unexpected results are not known.

This application is a continuation-in-part of application Serial No. 586,625, filed April 4, 1945.

It is not intended that this invention be limited to the specific materials which have been given merely for the sake of illustration, but only by the appended claims in which it is intended to claim all novelty inherent in the invention as well as all modifications coming within the scope and spirit of the invention.

What is claimed is:

1. A lubricant comprising a major proportion of a mineral lubricating oil base stock containing dissolved therein about 0.1 to 10% by weight of a copolymer prepared from 80 to 99 parts by weight of an aliphatic monoolefin containing from 3 to 5 carbon atoms and 20 to 1 parts by weight of dihydronaphthalene, said copolymer being copolymerized at a temperature below 0° C. in the presence of a Friedel-Crafts catalyst and having a molecular weight within the range of 2,000 to 30,000.

2. A lubricant comprising a major proportion of a mineral lubricating oil base stock containing dissolved therein about 0.1% to 10% by weight of a copolymer prepared from 80 to 99 parts by weight of isobutylene and 20 to 1 parts by weight of dihydronaphthalene, said copolymer being copolymerized at a temperature below 0° C. in the presence of a Friedel-Crafts catalyst and having a molecular weight within the range of from 5,000 to 20,000.

3. A lubricant comprising a major proportion of a mineral lubricating oil containing dissolved therein about 0.1 to 10% by weight of a copolymer prepared from 80 to 99 parts by weight of isobutylene and 20 to 1 parts by weight of dihydronaphthalene, said copolymer being copolymerized at a temperature below 0° C. in the presence of aluminum chloride and having a molecular weight of about 5,000.

4. A lubricant comprising a major proportion of a mineral lubricating oil containing dissolved therein about 0.1 to 10% by weight of a copolymer of about 1 to 5% by weight of dihydronaphthalene and 95 to 99% by weight of isobutylene, said copolymer being copolymerized at a temperature below 0° C. in the presence of aluminum chloride and having a molecular weight within a range of from 5,000 to 20,000.

EUGENE LIEBER.

REFERENCES CITED

The following references are of record in the file of this patent:

UNITED STATES PATENTS

| Number | Name | Date |
|---|---|---|
| 2,246,311 | Lieber | June 17, 1941 |
| 2,274,749 | Smyers | Mar. 3, 1942 |

FOREIGN PATENTS

| Number | Country | Date |
|---|---|---|
| 42,897 | France | Aug. 28, 1933 |
| (Addition to No. 740,407) | | |

OTHER REFERENCES

Richters' Organic Chemistry, vol II (1926), 11th Ger. ed., pp. 683, 684.